United States Patent
Rieling et al.

(10) Patent No.: US 8,506,453 B2
(45) Date of Patent: Aug. 13, 2013

(54) METHOD FOR OPERATING A TORQUE-TRANSMITTING SYSTEM AND TORQUE-TRANSMITTING SYSTEM

(75) Inventors: Jörg Rieling, Braunschweig (DE); Guido Wachsmuth, Berlin (DE); Dennis König, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 270 days.

(21) Appl. No.: 13/003,471

(22) PCT Filed: May 30, 2009

(86) PCT No.: PCT/EP2009/003900
§ 371 (c)(1),
(2), (4) Date: Mar. 18, 2011

(87) PCT Pub. No.: WO2010/003486
PCT Pub. Date: Jan. 14, 2010

(65) Prior Publication Data
US 2011/0162932 A1 Jul. 7, 2011

(30) Foreign Application Priority Data
Jul. 9, 2008 (DE) .......................... 10 2008 032 304

(51) Int. Cl.
*F16H 61/38* (2006.01)
*F16H 61/48* (2006.01)
(52) U.S. Cl.
USPC ................................. 477/52; 477/53; 477/57
(58) Field of Classification Search
USPC .................................................... 477/52–57
See application file for complete search history.

(56) References Cited

U.S. PATENT DOCUMENTS

| | | | |
|---|---|---|---|
| 5,679,091 A | 10/1997 | Salecker et al. | |
| 6,188,943 B1 * | 2/2001 | Uchida et al. | 701/54 |
| 6,565,483 B2 * | 5/2003 | Segawa et al. | 477/174 |
| 7,770,676 B2 | 8/2010 | Tenbrock et al. | |

FOREIGN PATENT DOCUMENTS

| | | |
|---|---|---|
| DE | 195 04 935 A1 | 8/1995 |
| DE | 103 60 587 A1 | 7/2005 |

(Continued)

OTHER PUBLICATIONS

German Patent and Trademark Office Search Report, Dated Apr. 20, 2009.

(Continued)

*Primary Examiner* — Tisha Lewis
(74) *Attorney, Agent, or Firm* — Laurence A. Greenberg; Werner H. Stemer; Ralph E. Locher

(57) ABSTRACT

A method for operating a torque-transmitting system, which is coupled on the input side to an output shaft of a drive assembly and on the output side to an input shaft of a transmission. A torque flux from the drive assembly to the transmission passes via the torque-transmitting system. The torque-transmitting system includes a hydrodynamic torque converter via which a hydraulic path of the torque flux passes, a converter lockup clutch which is arranged functionally in parallel with the torque converter and via which a mechanical path of the torque flux passes, and a control unit which controls distribution of the torque flux between the hydraulic and mechanical paths in such a way that a predetermined overall torque profile is established at the input shaft of the transmission.

10 Claims, 1 Drawing Sheet

(56) References Cited

FOREIGN PATENT DOCUMENTS

| DE | 10 2004 016 846 A1 | 10/2005 |
| DE | 10 2005 004 227 A1 | 11/2006 |
| DE | 10 2006 018 057 A1 | 11/2007 |

OTHER PUBLICATIONS

International Search Report of PCT/EP2009/003900, Dated Sep. 7, 2009.

* cited by examiner

METHOD FOR OPERATING A TORQUE-TRANSMITTING SYSTEM AND TORQUE-TRANSMITTING SYSTEM

BACKGROUND OF THE INVENTION

Field of the Invention

The invention relates to a method for operating a torque-transmitting system,
  which is coupled on the input side to an output shaft of a drive unit and on the output side to an input shaft of a transmission arrangement, so that a torque flux runs from the drive unit to the transmission arrangement via the torque-transmitting system, and
  which comprises:
  a hydrodynamic torque converter via which a hydraulic path of the torque flux runs,
  a lockup clutch which is arranged functionally parallel to the torque converter and via which a mechanical path of the torque flux runs, and
  a control unit which controls distribution of the torque flux between the hydraulic path and the mechanical path in such a way that a predetermined overall torque profile is set at the input shaft of the transmission arrangement.

The invention also relates to a torque-transmitting system, which is coupled on the input side to a drive shaft of a drive unit and on the output side to an input shaft of a transmission arrangement, so that a torque flux runs from the drive unit to the transmission arrangement via the torque-transmitting system, and
  which comprises:
  a hydrodynamic torque converter via which a hydraulic path of the torque flux runs,
  a lockup clutch which is arranged functionally parallel to the torque converter and via which a mechanical path of the torque flux runs, and
  a control unit which controls distribution of the torque flux between the hydraulic path and the mechanical path in such a way that a predetermined overall torque profile is set at the input shaft of the transmission arrangement.

PRIOR ART

Such methods and devices are known from DE 195 04 935 A1.

This document discloses a torque-transmitting system of a engine vehicle between a drive unit which is connected upstream and a transmission which is connected downstream. The system comprises a hydrodynamic torque converter and a slip-controlled lockup clutch.

The use of hydrodynamic torque converters for transmitting a torque from a drive unit to a transmission has been known for a long time. In particular during starting processes it is known to transmit the entire torque via this hydraulic path. However, in the case of high rotational speeds at the transmission input, the torque transmission via a purely mechanical path is usually more favorable. Hydrodynamic torque converters are therefore typically arranged parallel to a lockup clutch, which can be embodied, for example, as a friction clutch. In classic starting processes, the vehicle is then frequently started by means of the torque converter with the lockup clutch open, and the lockup clutch is closed when sufficient rotational speeds are reached, so that the torque is transmitted via the mechanical path.

However, in particular in conjunction with modern electric drives or hybrid drives, the requirements made of the torque branching during the transmission have significantly increased in complexity. Against the background of a use of energy which is as efficient as possible, in modern vehicles there is frequently a change in the working point of the drive unit in order to allow the latter to run as continuously as possible in the most efficient operating mode. In this context torque jumps may occur on the output side of the torque-transmitting system, which are sensed by the driver of the engine vehicle as unpleasant and unpredictable.

The cited document combats this problem by means of slip control of the lockup clutch. This is advantageous in terms of energetic considerations.

OBJECT OF THE INVENTION

The object of the present invention is to make the generic torque-transmitting systems and their operating methods more efficient.

PRESENTATION OF THE INVENTION

This object is achieved in conjunction with the features of the preamble of the primary method claim, by means of the following method steps which are carried out by means of the control unit:
  determination of the torque which is currently transmitted by the lockup clutch,
  comparison of the determined torque with a predetermined setpoint overall torque and calculation of a corresponding difference torque,
  determination of the current output speed of the torque converter,
  calculation of a setpoint input speed of the torque converter which would be necessary to transmit the difference torque via the hydraulic path when the output speed is determined, and
  setting of the output speed of the drive unit to the calculated input speed or a value which corresponds thereto taking into account intermediately connected transmission elements.

This object is also achieved in conjunction with the features of the preamble of the primary device claim in that the control unit:
  determines the torque which is currently transmitted by the lockup clutch,
  compares the determined torque with a predetermined setpoint overall torque and calculates a corresponding difference torque,
  determines the current output speed of the torque converter,
  calculates a setpoint input speed of the torque converter which would be necessary to transmit the difference torque via the hydraulic path when the output speed is being determined, and
  sets the output speed of the drive unit to the calculated input speed or a value which corresponds thereto taking into account intermediately connected transmission elements.

Advantageous embodiments and developments of the invention are the subject matter of the dependent claims.

The core of the invention is to dispense with the slip control of the lockup clutch, which is replaced by a speed control of the input side of the hydrodynamic converter. If a changeover is necessary, for example during the starting process for the hybrid vehicle, from a torque flux which is transmitted completely or mainly via the mechanical path to a torque flux which is transmitted mainly or completely via the hydraulic path, in order, for example, to allow the drive unit to operate at a more favorable operating point, the lockup clutch can be opened essentially without a process, i.e. without slip control. The value of the torque transmitted via the mechanical branch, which decreases in the process, is continuously determined. This determination can be carried out by direct measurement of the torque transmitted at the lockup clutch or by a calculation. The preferred case of calculation requires knowledge of a torque characteristic curve, which represents the respectively transmitted torque as a function of the clutch position. The clutch position can either be measured or is known on the basis of the actuation, for example with actuating engines or stopping engines. The torque which is actually transmitted via the lockup clutch is compared with a setpoint overall torque. That torque which is to be applied to the input of the transmission arrangement is to be understood as the setpoint overall torque. This can be determined, for example, by the driver's request, expressed, for example, by the position of the accelerator pedal or by a control unit. It is to be noted that this is not a static torque, or rather typically a torque profile which varies over time. In particular embodiments, said torque profile can be predefined or extrapolated by means of suitable models.

The comparison of the torque which is transmitted by the lockup clutch with the setpoint overall torque leads to the calculation of a difference torque. The difference torque is that torque which has to be additionally transmitted to the torque transmitted by the lockup clutch by the torque converter, so that the setpoint torque is present at the transmission input as a sum of the partial torques which are transmitted via the mechanical path and the hydraulic path.

Subsequently, the system attempts also to transmit the difference torque actually via the torque converter. The essential criterion here is to transmit this torque at the rotational speed which is currently present at the transmission input, i.e. essentially the current output speed of the torque converter. A typical torque converter has a design-related passive transmission characteristic. This relates the transmitted torque at a given output speed to an input speed of the converter. Given knowledge of this transmission characteristic, it is therefore possible to calculate the input speed of the converter which is necessary to transmit the difference torque at the current output speed of the converter. This calculation takes place in the control unit. For the purpose of implementation, the drive unit is set to the corresponding rotational speed.

A corresponding method with the same determination steps, calculation steps and setting steps can also be used in the opposite case of the closing of the lockup clutch.

As mentioned, the knowledge of the passive transmission characteristic of the converter is necessary to calculate the setpoint input speed of the torque converter. In one embodiment of the invention there is provision that the calculation is carried out on the basis of stored computational rules which take into account the passive transmission characteristics of the torque converter, i.e. the setpoint input speed is continuously newly calculated using stored formulas and algorithms. Alternatively or additionally, the setpoint input speed of the torque converter can be calculated on the basis of a stored characteristic diagram, i.e. can be read off essentially from corresponding tables. Combinations of the two methods can comprise, for example, a rough calculation by reading from a rough characteristic curve diagram and fine adjustment by extrapolation or interpolation.

The drive unit can comprise one or more electric engines and/or one or more internal combustion engines. In the case of the internal combustion engine, it is to be noted that the latter always requires a minimum speed in the switched-on state. This can be taken into account by virtue of the fact that the method according to the invention is carried out under the peripheral condition of a minimum output speed of the internal combustion engine. In the case of a hybrid drive, this can mean that the internal combustion engine is switched off as soon as there is the risk of the minimum output speed being undershot. Alternatively, in such a situation it is also possible to use an additional slip control of the lockup clutch.

DESCRIPTION OF PREFERRED EMBODIMENTS

Figure 1:
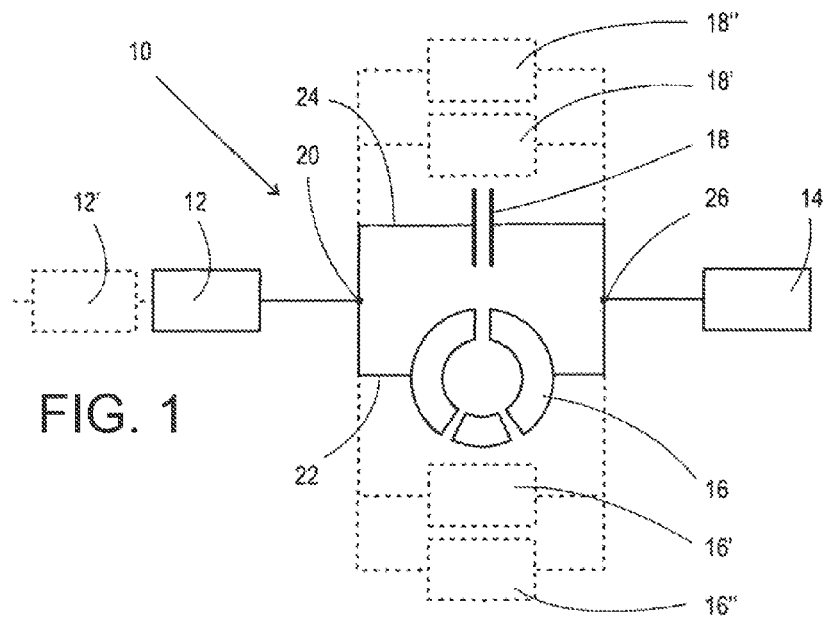
FIG. 1 shows a schematic illustration of the design of a torque-transmitting system.

FIG. 1 shows, in a highly schematic illustration, a torque-transmitting system 10 which is suitable for applying the present invention. The torque-transmitting system 10 connects a drive unit 12 to a transmission 14, connected downstream, of an engine vehicle. The transmission 14 is typically connected to further components of a drive train (not illustrated). The illustrated torque-transmitting system 10 comprises a hydrodynamic torque converter 16 and a lockup clutch 18 which is connected in parallel therewith and is embodied in the present case as a friction clutch. At a front branching point 20, which constitutes an interface between the torque-transmitting system 10 and the drive unit 12, the torque flux branches into a hydraulic path 22, which leads via the hydrodynamic converter 16, and into a mechanical path 24, which leads via the lockup clutch 18. In a rear branching point 26, which constitutes an interface between the torque-transmitting system 10 and the transmission 14, the paths 22, 24 are combined again. Depending on the setting of the system, the overall torque which is supplied by the drive unit 12 can flow completely via the hydraulic path 22, completely via the mechanical path 24 or partially via the hydraulic path 22 and partially via the mechanical path 24.

FIG. 1 shows, in an illustration using dashed lines, a further drive unit 12' and further torque-transmitting elements 16', 16" and 18', 18", respectively. This is intended to indicate that the present invention is not restricted to systems with an engine 12, a hydrodynamic converter 16 and a lockup clutch 18. Instead, it can also be applied to extended systems with basically any desired number of engines and any desired number of torque-transmitting elements.

Figure 2:
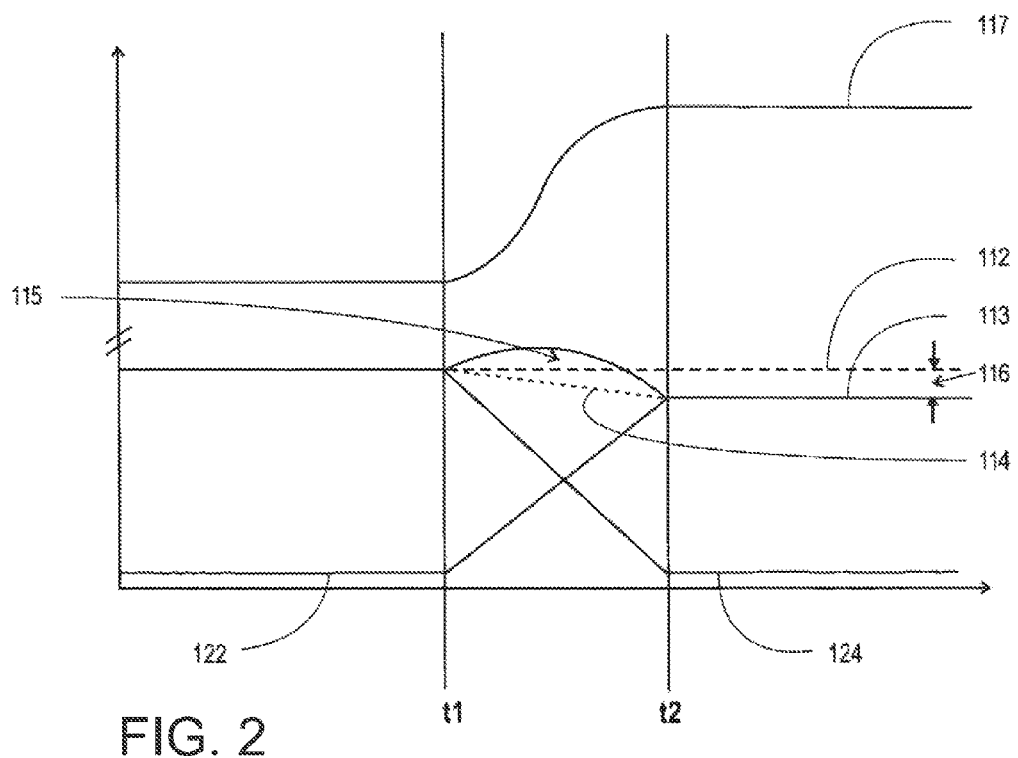
FIG. 2 shows a schematic illustration of the profiles for the torque and rotational speed within the scope of the method according to the invention.

FIG. 2 shows purely by way of example and in a highly schematic form the profile of torques and rotational speeds in an arrangement according to FIG. 1 when the method according to the invention is applied. The graph 112 shows the overall torque which is output to the drive train. In the illustrated example, the overall torque 112 is to be kept constant according to the driver's request or according to a presetting by a superordinate control device. The graph 113 shows the drive torque which is generated by the drive unit. The graph 122 shows the partial torque which is transmitted via the hydraulic path 22. The graph 124 shows the partial torque which is transmitted via the mechanical path.

The graph 116 shows the rotational speed applied on the input side of the torque converter 16. Said rotational speed corresponds to the output speed of the drive unit 12 in an arrangement according to FIG. 1. In other embodiments it is basically conceivable that the transmission stage be arranged between the output of the drive unit 12 and the input of the torque converter 16, which transmission stage has to be taken into account in the implementation of the method according to the invention. The significant concept of the invention is, however, easier to recognize for a person skilled in the art on the basis of the simplified cases illustrated in the figures.

FIG. 2 reflects a scenario in which the engine torque 113 is firstly transmitted completely via the mechanical path 24. In other words, the drive occurs with the clutch 18 closed. The transmitted overall torque 112 is therefore initially equal to the partial torque 124 which is transmitted via the mechanical path 24 and equal to the engine torque 113. The partial torque 122 which is transmitted via the hydraulic path is essentially zero. In this situation, the drive unit 12 operates at a comparatively low rotational speed level 116.

If the drive unit 12 is, for example, an electric engine, it may be the case that disadvantageously high currents have to flow in order to apply a high overall torque 112 at a low rotational speed 116. If, on the other hand, the drive unit 12 is an internal combustion engine it may be the case, for example, that the applied low rotational speed 116 is not sufficient to produce the required overall torque 112 or that the internal combustion engine operates at an unfavorable operating point considered in terms of consumption. For these or other reasons, a control unit (not illustrated in more detail) may make the decision to shift the current working point of the drive unit 12 to a relatively high rotational speed. However, this is to take place without adverse effects on the comfort for the driver and in particular without jumps in torque or rotational speed at the input of the transmission 14.

Therefore, at the time t1 when the method according to the invention is applied, a change of working point is initiated which is terminated at the time t2. The lockup clutch 18 is opened during the change of working point. The opening takes place essentially without a process, i.e. through direct actuation and without control mechanisms, like a slip control, for example. The opening of the lockup clutch 18 causes the partial torque 124 transmitted via the mechanical path 24 to drop to zero in the completely opened state of the lockup clutch 18. It is to be noted that complete opening of the clutch 18 is not absolutely necessary, but rather is assumed here only for the sake of illustration. This drop in the partial torque 124 is recorded by the control unit. This advantageously occurs on the basis of a known torque characteristic curve which is stored in the memory of the control unit, and by means of which the maximum torque which can be transmitted as a function of the clutch position is known. Furthermore, the required overall torque 112 is known to the control unit. In order to determine said overall torque 112 it is possible to use any desired methods which can comprise, for example, interpretation of an accelerator pedal position as a driver's request, presettings of an automatic controller with or without interpolations or extrapolations of the chronological torque profile.

From the required overall torque 112 and the mechanically transmitted partial torque 124 which has dropped during the transition, the control unit determines a difference torque. In order to make available the overall torque 112, the difference torque has to be transmitted via the hydraulic path 22 in addition to the partial torque 124 which is transmitted via the mechanical path 24, and said difference torque therefore corresponds to the partial torque 122 which is transmitted via the torque converter 16 and which has to be correspondingly raised during the transition between t1 and t2.

The raising of the partial torque 122 which is transmitted via the hydraulic branch 22 is carried out with rotational speed control of the drive unit 12. For this purpose, the passive characteristic of the torque converter 16 must be known to the control unit, for example in the form of a stored characteristic diagram. The control unit can therefore calculate which input speed has to be present at the torque converter 16 for the latter to supply the required torque at its output at the current output speed. This calculated rotational speed is then set at the drive unit, wherein transmission stages which are possibly intermediately shifted are taken into account. In this context, the converter increase 117 is taken into account so that after t2 the engine torque 113 is lower than before t1. Furthermore, during the transition between t1 and t2 the composition of the torque of the static component 114 and dynamic component 115 is taken into account.

As a result, in the illustrated embodiment the overall torque profile 112 at the output is constant while the torque is transmitted from the mechanical branch 24 to the hydraulic branch 22, specifically with control of the rotational speed of the drive unit 12. The clutch 18 can be opened essentially without a process.

Of course, the embodiments discussed in the specific description and shown in the drawings are only illustrative exemplary embodiments of the present invention. In light of this disclosure, a person skilled in the art is provided with a wide spectrum of variation possibilities. In particular, the design and number of the torque-transmitting elements, 16, 16', 16", ... and 18, 18', 18", ... as well as the number and design of the drive units 12, 12', ... can be freely selected by a person skilled in the art in accordance with the respective individual case.

List of Reference Numerals

10 Torque-transmitting system 12
12 Drive unit
12' Drive unit
14 Transmission
16 Hydraulic torque converter
16' Further torque-transmitting element
16" Further torque-transmitting element
18 Lockup clutch
18' Further torque-transmitting element
18" Further torque-transmitting element
20 Front branching point
22 Hydraulic path
24 Mechanical path
26 Rear branching point
112 Graph of the overall torque
113 Engine torque
114 Static component of 113
115 Dynamic component of 113
116 Graph of the rotational speed at the input of 16
117 Converter increase
122 Partial torque transmitted via 22
124 Partial torque transmitted via 24

The invention claimed is:

1. A method of operating a torque-transmitting system, wherein the torque-transmitting system has an input side coupled to an output shaft of a drive unit and an output side coupled to an input shaft of a transmission and a torque flux runs from the drive unit via the torque-transmitting system to the transmission, the torque-transmitting system including:
a hydrodynamic torque converter via which a hydraulic path of the torque flux runs;
a lockup clutch disposed functionally in parallel with the torque converter and via which a mechanical path of the torque flux runs; and a control unit configured to control a distribution of the torque flux between the hydraulic path and the mechanical path for setting a predetermined overall torque profile at the input shaft of the transmission;

the method which comprises the following method steps, to be carried out by the control unit:

determining a torque currently being transmitted by the lockup clutch;

comparing the torque thus determined with a predetermined setpoint overall torque and calculating a corresponding difference torque;

determining a current output speed of the torque converter;

calculating a setpoint input speed of the torque converter that would be necessary at the output speed thus determined to transmit the difference torque via the hydraulic path; and setting the output speed of the drive unit to the calculated input speed or a value corresponding thereto.

2. The method according to claim 1, which comprises determining the torque that is currently being transmitted by the lockup clutch from a current clutch setting in conjunction with a stored torque characteristic curve.

3. The method according to claim 1, which comprises measuring the torque that is currently being transmitted by the lockup clutch with a torque-measuring device.

4. The method according to claim 1, which comprises calculating the setpoint input speed of the torque converter on a basis of stored computational rules.

5. The method according to claim 1, which comprises calculating the setpoint input speed of the torque converter on a basis of a stored characteristic diagram.

6. The method according to claim 1, wherein the drive unit comprises an electric engine.

7. The method according to claim 1, wherein the drive unit comprises an internal combustion engine.

8. The method according to claim 7, which comprises carrying out the method steps under a peripheral condition of a minimum output speed of the internal combustion engine.

9. The method according to claim 8, which comprises, if the peripheral condition cannot be maintained, activating a slip control of the lockup clutch.

10. A torque-transmitting system having an input side coupled to an output shaft of a drive unit and an output side coupled to an input shaft of a transmission and a torque flux runs from the drive unit via the torque-transmitting system to the transmission, the torque-transmitting system comprising:

a hydrodynamic torque converter defining a hydraulic path of the torque flux;

a lockup clutch arranged functionally in parallel to said torque converter and defining a mechanical path of the torque flux runs; and a control unit configured to control a distribution of the torque flux between the hydraulic path and the mechanical path to set a predetermined overall torque profile at the input shaft of the transmission, and configured to:

determine a torque that is currently being transmitted by said lockup clutch;

compare the torque with a predetermined setpoint overall torque and calculating therefrom a difference torque;

determine a current output speed of said torque converter;

calculate a setpoint input speed of said torque converter that would be necessary at the current output speed to transmit the difference torque via the hydraulic path; and set the output speed of the drive unit to the calculated input speed or a corresponding value.

\* \* \* \* \*